United States Patent
Nemlekar et al.

(10) Patent No.: US 11,573,765 B2
(45) Date of Patent: Feb. 7, 2023

(54) FUSED CONVOLUTION AND BATCH NORMALIZATION FOR NEURAL NETWORKS

(71) Applicant: ADVANCED MICRO DEVICES, INC., Santa Clara, CA (US)

(72) Inventors: Milind N. Nemlekar, San Diego, CA (US); Prerit Dak, San Diego, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 989 days.

(21) Appl. No.: 16/219,154

(22) Filed: Dec. 13, 2018

(65) Prior Publication Data

US 2020/0192631 A1    Jun. 18, 2020

(51) Int. Cl.
*G06N 3/04*  (2006.01)
*G06F 5/01*  (2006.01)
*G06F 17/16* (2006.01)
*G06N 3/08*  (2006.01)

(52) U.S. Cl.
CPC .......... *G06F 5/01* (2013.01); *G06F 17/16* (2013.01); *G06N 3/04* (2013.01); *G06N 3/08* (2013.01)

(58) Field of Classification Search
CPC .... G06F 5/01; G06F 17/16; G06F 2207/4824; G06F 7/5443; G06N 3/04; G06N 3/08; G06N 3/0481; G06N 3/063; G06N 3/0454
See application file for complete search history.

(56) References Cited

U.S. PATENT DOCUMENTS

| | | | |
|---|---|---|---|
| 2018/0189640 A1* | 7/2018 | Henry | G06F 9/3893 |
| 2018/0189652 A1* | 7/2018 | Korthikanti | G06F 17/16 |

FOREIGN PATENT DOCUMENTS

EP    3686734 A1 *  7/2020  ........... G06F 12/023

OTHER PUBLICATIONS

Zhao, (A Faster Algorithm for Reducing the Computational Complexity of Convolutional Neural Networks), Oct. 18, 2018 (Year: 2018).*
Ioffe, Sergey, "Batch Normalization: Accelerating Deep Network Training by Reducing Internal Covariate Shift", Cornell University Library, arXiv.org:1502.03167, Feb. 11, 2015, 11 pages.

* cited by examiner

*Primary Examiner* — David R Vincent

(57) ABSTRACT

A processing unit implements a convolutional neural network (CNN) by fusing at least a portion of a convolution phase of the CNN with at least a portion of a batch normalization phase. The processing unit convolves two input matrices representing inputs and weights of a portion of the CNN to generate an output matrix. The processing unit performs the convolution via a series of multiplication operations, with each multiplication operation generating a corresponding submatrix (or "tile") of the output matrix at an output register of the processing unit. While an output submatrix is stored at the output register, the processing unit performs a reduction phase and an update phase of the batch normalization phase for the CNN. The processing unit thus fuses at least a portion of the batch normalization phase of the CNN with a portion of the convolution.

20 Claims, 4 Drawing Sheets

FUSED CONVOLUTION AND BATCH NORMALIZATION FOR NEURAL NETWORKS

BACKGROUND

Description of the Related Art

Neural networks are employed in a variety of "deep learning" applications, such as image analysis (e.g., feature identification from a captured image), computer vision, speech recognition, natural language parsing, medical diagnosis, and others. The neural network can be composed of a set of interconnected nodes that each apply a corresponding weighted transform to node inputs, wherein the weight of one or more of the nodes is adjusted over time. The changing weights thereby reflect the evolution, or "learning" of the neural network. For modern neural networks, the number of network layers, and therefore the number of interconnected nodes, can be relatively large, requiring a processor to perform a correspondingly large number of calculations to implement the neural network. To increase the efficiency of the neural network, at least a portion of the calculations can be assigned to a processing unit, such as a graphics processing unit (GPU), designed to execute the calculations more efficiently. However, conventional approaches to neural networks can consume a large amount of resources at the processing unit.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 illustrate techniques for implementing a convolutional neural network (CNN) at processing unit, such as a GPU, by fusing at least a portion of a convolution phase of the CNN with at least a portion of a batch normalization phase. For example, in some embodiments, the processing unit convolves two input matrices representing inputs and weights of a portion of the CNN to generate an output matrix. The processing unit performs the convolution via a series of multiplication operations, with each multiplication operation generating a corresponding submatrix (or "tile") of the output matrix at an output register of the processing unit. While an output submatrix is stored at the output register, the processing unit performs a reduction phase and an update phase of the batch normalization phase for the CNN. The processing unit thus fuses at least a portion of the batch normalization phase of the CNN with a portion of the convolution, thereby reducing the number of reads from a read buffer.

In contrast to the techniques described herein, a conventional processing unit conducts the convolution phase in full, calculating the entire output matrix, before proceeding to the batch normalization phase. This approach requires a relatively high number of data fetches. For example, different portions of the output matrix must be repeatedly fetched to perform the batch normalization. The data fetches consume processor resources, including power. Accordingly, by fusing at least a portion of the batch normalization phase with the convolution as described herein, processor performance is improved.

Figure 1:
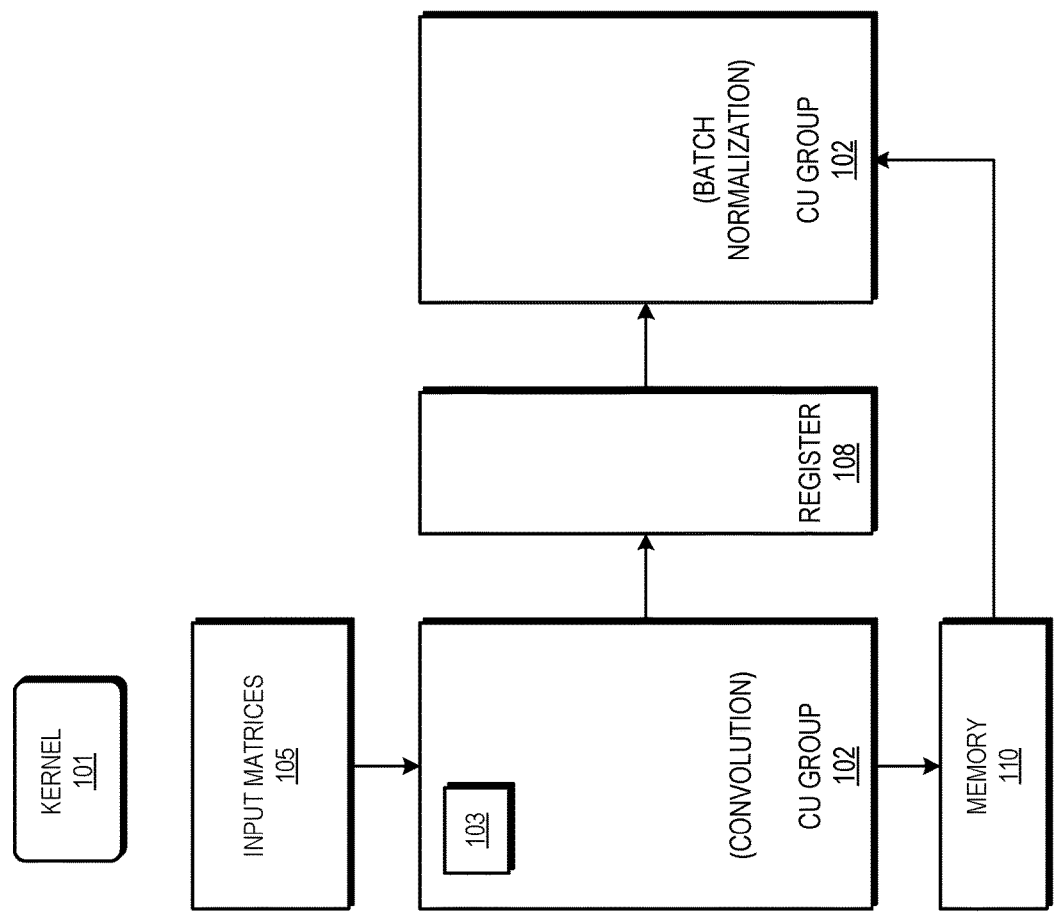
FIG. 1 is a block diagram of a graphics processing unit (GPU) that implements a convolutional neural network (CNN) with a fused convolution and batch normalization in accordance with some embodiments.

FIG. 1 illustrates a GPU 100 of a processor that employs shared loads in accordance with some embodiments. In at least one embodiment, the GPU 100 is part of a processor that is generally configured to execute sets of instructions in order to carry out operations on behalf of an electronic device. Accordingly, in different embodiments the GPU 100 is part of an electronic device such as a desktop or laptop computer, a server, a handheld electronic device such as a smartphone or tablet, a game console, and the like. The GPU 100 is generally configured to execute graphics and vector processing operations on behalf of the processor. For example, in some embodiments, a central processing unit (CPU, not shown at FIG. 1) of the processor provides the GPU 100 with sets of operations for execution, whereby the sets of operations are associated with graphics or vector processing.

One type of set of operations that is provided by the GPU 100 is referred to herein as a set of convolutional neural network (CNN) operations. As used herein, CNN operations refer to sets of operations, such as matrix multiplication operations, to implement a convolutional neural network. As will be appreciated by one skilled in the art, the CNN includes layers of nodes wherein input values to each node are convolved with a set of adjustable weights corresponding to the node. The operations to implement the CNN can be grouped into 3 categories, or phases: a convolution phase, a batch normalization (BN) phase, and an activation phase, referred to herein as a Relu phase. The different phases can be repeated for each layer of the CNN to implement more complex and robust neural networks.

In some embodiments, each BN phase is divided by the GPU 100 into two different phases: a reduction phase, wherein the GPU 100 calculates normalization values for an output matrix of a convolution phase, and an update phase, wherein the GPU 100 updates the values of the output matrix based on the normalization values. Examples of the normalization values include an average of the output matrix elements and variance of those elements. As described further herein, the GPU 100 is generally configured to implement a CNN by fusing the reduction phase of a BN phase with the corresponding convolution phase. For example, in some embodiments the GPU 100 calculates the output matrix of a convolution phase by generating submatrices (tiles) of the output matrix. The GPU 100 calculates the normalization values based on each tile as the corresponding tile is generated. Once all tiles of the convolution output matrix have been calculated, and the corresponding normalization values generated, the GPU 100 performs the update phase of the BN phase with the complete output matrix. By fusing the reduction phase with the convolution phase in this way, the GPU 100 reduces the number of data fetches associated with implementing the CNN, thereby improving processor performance.

To facilitate execution of the convolution operations, the GPU 100 includes a plurality of compute units (CUs) CU 103). Each of the CUs is configured to execute assigned operations independently of, and concurrent with, the other CUs to allow the GPU 100 to execute complex operations, such as matrix multiplication, relatively quickly. Accordingly, in some embodiments, each of the CUs includes a plurality of Single-Instruction Multiple-Data (SIMD) processing units, fetch and decode logic to fetch and decode instructions for the SIMD units, a register file to store operands for the SIMD units, and the like.

In the illustrated embodiment, the CUs of the GPU 100 are logically divided into different groups, (e.g. CU group 102). In some embodiments, the logical grouping of the CUs, and the designation of the corresponding operations, is performed by a scheduler (not shown) or other control module that assigns operations to the individual CUs. Further, it will be appreciated that in some embodiments the CUs of the GPU 100 are assigned to more than one group, such that a CU may be assigned to perform different designated operations at different times.

As described further below, the CUs of the group 102 are configured to execute, based on a kernel 101, fused convolution and batch normalization operations. Each CU of the group 102 computes a partial result area of an output channel for a batch of images. This result is stored in registers. The mean and variance operations for batch normalization are computed partially within a wave/workgroup. These partial values are then stored in memory 110 and updated using atomic add operations. The workgroups running on a set of CUs then synchronize on a global barrier. This guarantees that a correct mean and variance has been computed, before moving on to the update phase of batch normalization.

Figure 2:
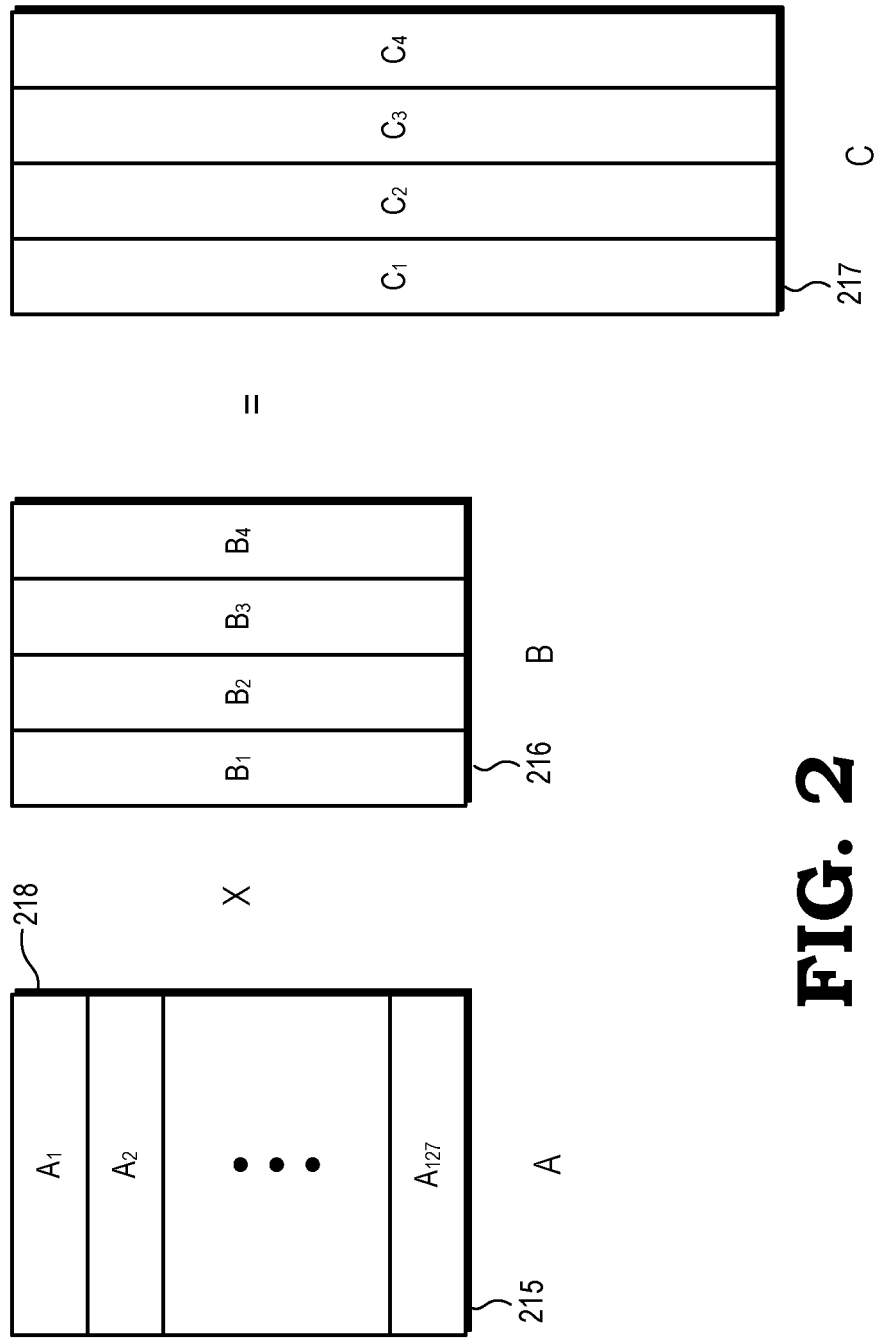
FIG. 2 is a diagram illustrating example matrices multiplied by the GPU of FIG. 1 to implement convolution as a general matrix multiply (GEMM) operation in accordance with some embodiments.

With respect to the convolution operations, for each node of the CNN the group 102 receives input matrices 105 and performs a series of matrix multiplications to generate an output matrix representing the results of a convolution operation associated with the node. This can be better understood with reference to FIG. 2, which illustrates an example matrix multiplication operation performed by the group 102 in accordance with some embodiments. FIG. 2 illustrates input matrices 215 and 216, designated matrix A and matrix B, respectively. The CUs of the group 102 collectively multiply the A and B matrices to generate the output matrix 217, designated matrix C. In some embodiments, the elements of the matrix A represent a batch of input images with a number of channels, and the matrix B represents the weights for a node of the CNN. Further, the matrices A and B are composed (e.g., by the GPU 100 or other processor module) by stretching the weights and inputs into row and columns of the A and B matrices, respectively, so that the matrix C represents the convolution of the weights and inputs.

To perform the multiplication of A and B, the GPU 100 decomposes A and B into corresponding tiles (e.g., tile 218 of matrix A) where each tile is a submatrix including some, but not all, of the elements of the corresponding matrix. In some embodiments, each tile of the A matrix corresponds to a row, or plurality of rows, of the A matrix and each tile of the B matrix corresponds to a column, or set of columns, of the B matrix. The group 102 multiplies tiles of the A and B matrices to generate corresponding tiles of the output matrix C. Each tile of the result matrix is computed by splitting matrix A along the M dimension across CUs. Matrix B is broad cast to all CUs Workgroups are dispatched such that all the tiles for a set of output channels are resident on the GPU simultaneously. Thus, for each set of output channels Ck, each workgroup w computes Cwk where:

$$Cwk = Aw*Bk$$

$$Ck = \{C0k, C1k, \ldots, Cnk\}$$

Returning to FIG. 1, the CUs of the group 102 multiplies tiles of the A and B matrices, as described above, to generate each tile of the C matrix ($C_1$, $C_2$, $C_3$, and $C_4$) in succession. As the group 102 generates each tile of the C matrix, the tile is stored at in output registers 108. After the tiles of the C matrix are stored at the output register 108, the CUs of the group 102 perform a reduction phase of the batch normalization operation by calculating normalization values based on the tiles of the C matrix. For example, in some embodiments the group 102 calculates normalization values according to the following formulas:

For all $i$ in $C$ tile {

$\mu \mathrel{+}= x[i]$ $\sigma^2 \mathrel{+}= x[i] * x[i]$

} where x[i] is the ith element of the tile of the C matrix.

In some embodiments, rather than calculating the tiles of the C matrix in succession, different subgroups of CUs of the group 102 calculate a corresponding one of the tiles $C_1$ through $C_4$ and each tile is stored at a different output register. The CUs of the group 102 then calculate the $\mu$ and $\sigma^2$ values for each C tile and stores the values at a memory 110.

After the CUs of the group 102 have calculated the $\mu$ and $\sigma^2$ values for each C tile, the CUs of the group 102 add the different $\mu$ values and the different $\sigma^2$ values, respectively, and then finalize the reduction according to the following formulas:

$$\mu = \mu/N*H*W$$

$$\sigma^2 = \sigma^2/N*H*W$$

$$\sigma^2 = \sigma^2 - \mu^2$$

where N is the number of images in a mini-batch, and H and W are the dimensions of the image. Thus, after reduction the value $\mu$ is the mean of the elements of the C tile and the value $\sigma^2$ is the variance of the elements of the C tile.

After the reduction phase (that is, after the mean and variance values have been calculated) the CUs of the group 102 perform the update phase of batch normalization. In particular, the CUs of the group 102 update each element $x_i$ of the C matrix according to the following formula:

$$x_i(\text{updated}) = \frac{x_i - \mu}{\sqrt{\sigma^2 + \in}}$$

where $\in$ is a constant to provide numerical stability. The CUs of the group 102 store the updated, normalized C matrix at the register 108 108. After the update phase, the CUs of the group 102 apply an activation function, such as a Relu function, to the normalized C matrix to generate the output for the corresponding node of the CNN. The output of the node can be used in any application of a CNN, such as image analysis, image feature recognition, and the like.

Figure 3:
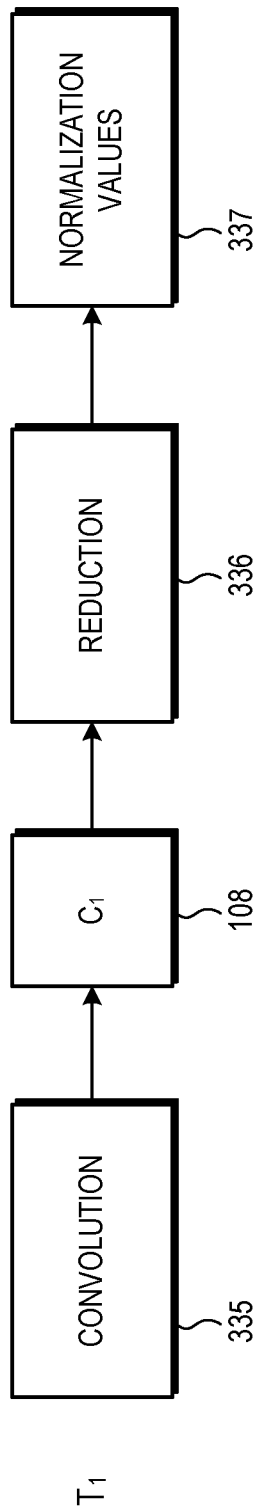
FIG. 3 is a diagram of an example of the GPU of FIG. 1 performing a reduction phase for batch normalization in accordance with some embodiments.

As noted above, by fusing the reduction phase of batch normalization with the convolution phase of a CNN, the GPU 100 conserves processor resources. An example is illustrated at FIG. 3, which depicts an example of two different convolution and reduction phases at the GPU 100 in accordance with some embodiments. In particular, FIG. 3 illustrates two different time periods, designated $T_1$ and $T_2$, wherein time period $T_2$ takes place after time period $T_1$. During time period $T_1$, the CUs of the group 102 perform a matrix multiplication operation, corresponding to a convolution phase 335 of the CNN, to generate the tile $C_1$. The CUs of the group 102 store the tile $C_1$ at the output register 108.

Once the tile $C_1$ is stored at the output register 108, the CUs of the group 102 perform a reduction phase 336 to calculate normalization values 337. In some embodiments, the normalization values are the $\mu$ and $\sigma^2$ values calculated according to the formulas set forth above. The CUs of the group 102 store the normalization values at the memory 110.

During subsequent time periods, not illustrated at FIG. 3, the CUs of the group 102 execute convolution phases to generate the tiles $C_3$ and $C_4$, respectively, and the CUs of the group 104 update the normalization values 337 in similar fashion as described with respect to the time period $T_1$. Thus, in the depicted example, as each tile of the C output matrix is generated, the tile is maintained at the register until the normalization values 337 have been updated based on the tile. In contrast, conventional CNN approaches calculate the entire C output matrix before proceeding to the reduction phase to calculate the normalization values. Each tile or other portion of the C output matrix must therefore be re-fetched for the reduction phase, consuming processor resources. In contrast, by maintaining each C tile at the register 108 for reduction, the GPU 100 reduces the number of data fetches associated with the reduction phase of batch normalization, and thus conserves processor resources.

Figure 4:
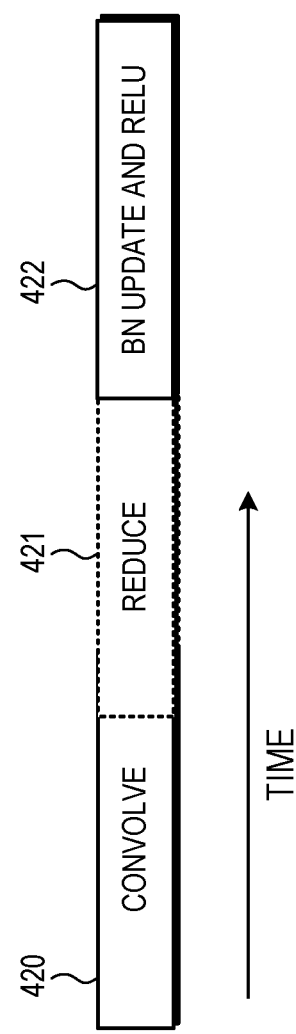
FIG. 4 is a diagram illustrating an example of the timing of the fused convolution and batch normalization at the GPU of FIG. 1 in accordance with some embodiments.

FIG. 4 illustrates a block diagram depicting an example of the timing of the fused convolution and batch normalization at the GPU 100 of FIG. 1 in accordance with some embodiments. FIG. 4 illustrates a convolution phase 420 and a reduction phase 421. The reduction phase 421 follows the convolution phase 420, because the GPU 100 performs reduction on each tile of the C output matrix as described above. Following the reduction phase 421, during a phase 422 the group of CUs 102 updates the C matrix using the normalization values calculated during the reduction phase. The group of CUs 102 then performs a Relu operation using the updated C matrix. The phase 422 is followed by a phase 423 wherein the group 102 of CUs begins another convolution phase.

Figure 5:
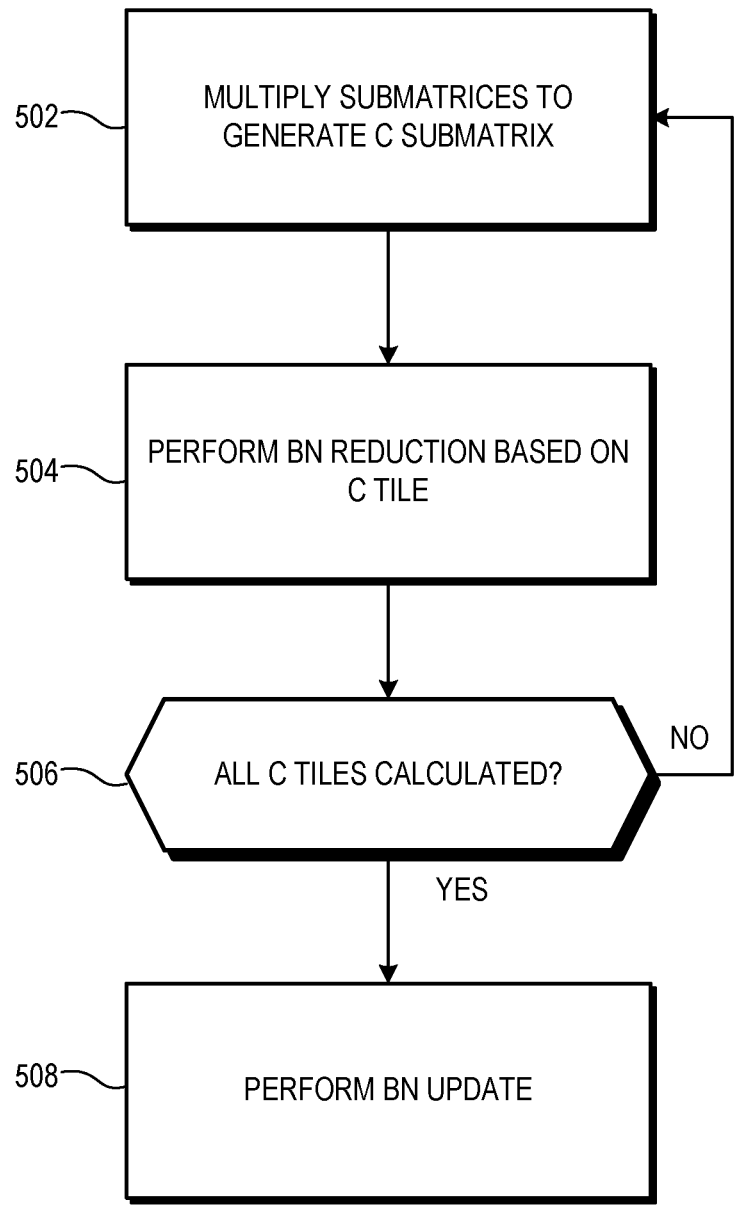
FIG. 5 is a flow diagram of a method of a processing unit fusing convolution and batch normalization for a CNN in accordance with some embodiments.

FIG. 5 illustrates a flow diagram of a method 500 of fusing a convolution phase of a CNN with a reduction phase of a batch normalization phase of the CNN in accordance with some embodiments. The method 500 is described with respect to an example implementation at the GPU 100 of FIG. 1. At block 502, the CU group 102 performs a matrix multiplication operation to multiply submatrices of the A and B input matrices 105, thereby generating a corresponding tile of the output matrix C. The CU group 102 stores the C tile at the register 108.

At block 504, while the C tile is stored at the register 108, the CU group 104 performs a BN reduction based on the C tile. For example, in some embodiments, the CU group 104 updates the $\mu$ and $\sigma^2$ values for the C matrix based on the C tile and stores the updated the $\mu$ and $\sigma^2$ values at the memory 110. At block 506, the GPU 100 determines if all of the tiles of the C output matrix have been generated. If not, the method flow returns to block 502 and the CU group 102 performs the matrix multiplication to generate the next C tile. If, at block 506, all tiles of the C matrix have been calculated, the method flow moves to block 508 and the CU group 104 updates the elements of the C matrix based on the $\mu$ and $\sigma^2$ values stored at the memory 110.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving, at a processing unit, a first input matrix, a second input matrix, and instructions fora plurality of convolution operations associated with a convolutional neural network, the instructions for the plurality of convolution operations including an instruction for a first convolution operation;
for executing the first convolution operation, multiplying ata group of compute units of the processing unit, a first submatrix of the first input matrix with a first submatrix of the second input matrix to generate a first output submatrix of a first output matrix; and
performing at the group of compute units, a first reduction operation of a batch normalization operation on the first output submatrix prior to generating a second output submatrix of the first output matrix.

2. The method of claim 1, further comprising:
multiplying a second submatrix of the first input matrix with a second submatrix of the second input matrix to generate the second output submatrix of the first output matrix.

3. The method of claim 2, further comprising:
performing a second reduction operation of the batch normalization operation on the second output submatrix prior to generating a third output submatrix of the first output matrix.

4. The method of claim 3, wherein performing the first reduction operation comprises:
computing a first sum of elements of the first output submatrix.

5. The method of claim 4, wherein performing the first reduction operation comprises:
computing a second sum of squares of the elements of the first output submatrix.

6. The method of claim 5, wherein performing the first reduction operation comprises: comprising computing a mean based on the first sum and a variance based on the second sum.

7. The method of claim 6, further comprising performing an update operation comprising normalizing the first output submatrix based on the mean and variance.

8. The method of claim 3, further comprising:
executing instructions for a second convolution operation of the instructions for the plurality of convolution operations.

9. A method, comprising:
at a group of compute units of a processing unit, multiplying a first plurality of submatrices of a first input matrix with corresponding ones of a second plurality of submatrices of a second input matrix to generate a plurality of output submatrices of an output matrix associated with a convolution operation;
for each of the plurality of output submatrices, performing a batch normalization reduction while the corresponding output submatrix is stored at an output register of a matrix multiplier prior to generating a subsequent output submatrix of the output matrix; and
after generating the output matrix, normalizing the output matrix based on the batch normalization reduction.

10. The method of claim 9, wherein performing the batch normalization reduction comprises generating an average and a variance for the corresponding output submatrix.

11. The method of claim 10, wherein performing the batch normalization reduction comprises normalizing the corresponding output submatrix based on a mean and a variance.

12. A processing unit, comprising:
a plurality of compute units, each compute unit configured to execute operations independently of, and concurrently with, other of the plurality of compute units;
the processing unit configured to receive a first input matrix, a second input matrix, and instructions for a plurality of convolution operations associated with a convolutional neural network, the instructions for the plurality of convolution operations including an instruction for a first convolution operation; and
the plurality of compute units configured to:
for executing the first convolution operation, multiply a first submatrix of the first input matrix with a first submatrix of the second input matrix to generate a first output submatrix of a first output matrix; and
perform a first reduction operation of a batch normalization operation on the first output submatrix prior to generating a second output submatrix of the first output matrix.

13. The processing unit of claim 12, wherein the plurality of compute units is configured to:
multiply a second submatrix of the first input matrix with a second submatrix of the second input matrix to generate the second output submatrix of the first output matrix.

14. The processing unit of claim 13, wherein the plurality of compute units is configured to:
performing a second reduction operation of the batch normalization operation on the second output submatrix prior to generating a third output submatrix of the first output matrix.

15. The processing unit of claim 13, wherein the plurality of compute units is configured to:
after generating output submatrices for a channel, performing an update operation for the first output matrix after multiplying submatrices of the first input matrix with submatrices of the second input matrix to generate the first output matrix for a subset of channels.

16. The processing unit of claim 15, wherein performing the first reduction operation comprises:
computing a first sum of elements of the first output submatrix.

17. The processing unit of claim 16, wherein performing the first reduction operation comprises:
computing a second sum of squares of the elements of the first output submatrix.

18. The processing unit of claim 17, wherein performing the first reduction operation comprises: comprising computing a mean based on the first sum and a variance based on the second sum.

19. The method of claim 1, further comprising:
storing the first output submatrix at an output register for the group of compute units; and performing the first reduction operation while the first output submatrix is stored at the output register.

20. The processing unit of claim 12, wherein each of the plurality of compute units comprises a plurality of Single-Instruction Multiple-Data (SIMD) processing units.

* * * * *

UNITED STATES PATENT AND TRADEMARK OFFICE
CERTIFICATE OF CORRECTION

| | |
|---|---|
| PATENT NO. | : 11,573,765 B2 |
| APPLICATION NO. | : 16/219154 |
| DATED | : February 7, 2023 |
| INVENTOR(S) | : Milind N. Nemlekar and Prerit Dak |

It is certified that error appears in the above-identified patent and that said Letters Patent is hereby corrected as shown below:

In the Claims

At Column 7 Line 18, in Claim 1, please correct "instructions fora plurality" to be --instructions for a plurality--

At Column 7 Line 24, in Claim 1, please correct "ata group" to be --at a group--

At Column 7 Line 51, in Claim 6, please correct "comprises: comprising computing a" to be --comprises: computing a--

At Column 8 Line 42, in Claim 14, please correct "performing a second reduction" to be --perform a second reduction--

At Column 8 Lines 47-48, in Claim 15, please correct "for a channel, per-forming an update" to be --for a channel, perform an update--

At Column 8 Lines 62-63, in Claim 18, please correct "comprises: comprising comput-ing a" to be --comprises: computing a--

Signed and Sealed this
Tenth Day of October, 2023

Katherine Kelly Vidal
*Director of the United States Patent and Trademark Office*